(12) United States Patent
De Lemos

(10) Patent No.: US 10,696,158 B2
(45) Date of Patent: Jun. 30, 2020

(54) SHAFT CONNECTION FOR A VEHICLE

(71) Applicant: CNH INDUSTRIAL LATIN AMERICA LTDA., Contagem-MG (BR)

(72) Inventor: José Francivaldo Pereira De Lemos, Sete Lagoas (BR)

(73) Assignee: CNH Industrial America LLC, New Holland, PA (US)

( * ) Notice: Subject to any disclaimer, the term of this patent is extended or adjusted under 35 U.S.C. 154(b) by 95 days.

(21) Appl. No.: 15/750,450

(22) PCT Filed: Aug. 3, 2016

(86) PCT No.: PCT/BR2016/050182
§ 371 (c)(1),
(2) Date: Feb. 5, 2018

(87) PCT Pub. No.: WO2017/020108
PCT Pub. Date: Feb. 9, 2017

(65) Prior Publication Data
US 2018/0222317 A1 Aug. 9, 2018

(30) Foreign Application Priority Data

Aug. 3, 2015 (BR) ...................... 10 2015 018592-8

(51) Int. Cl.
| | |
|---|---|
| *B60K 23/08* | (2006.01) |
| *B60K 17/22* | (2006.01) |
| *B60K 17/36* | (2006.01) |
| *B60K 17/02* | (2006.01) |
| *F16D 11/14* | (2006.01) |

(Continued)

(52) U.S. Cl.
CPC .............. *B60K 23/08* (2013.01); *B60K 17/02* (2013.01); *B60K 17/22* (2013.01); *B60K 17/36* (2013.01); *F16D 11/14* (2013.01); *F16D 25/061* (2013.01); *B60K 2023/0866* (2013.01); *B60Y 2200/14* (2013.01); *B60Y 2200/142* (2013.01); *B60Y 2200/1422* (2013.01); *B60Y 2400/422* (2013.01); *F16D 2011/004* (2013.01)

(58) Field of Classification Search
None
See application file for complete search history.

(56) References Cited

U.S. PATENT DOCUMENTS

| | | | | |
|---|---|---|---|---|
| 4,192,411 | A * | 3/1980 | Fogelberg | .......... B60K 17/3515 180/245 |
| 4,627,512 | A * | 12/1986 | Clohessy | .......... B60K 17/3515 180/247 |

(Continued)

FOREIGN PATENT DOCUMENTS

WO 2015080722 A1 6/2015

*Primary Examiner* — Timothy Hannon
(74) *Attorney, Agent, or Firm* — Peter Zacharias; Patrick Sheldrake

(57) ABSTRACT

An automotive vehicle axle and, more specifically, a transmission shaft on an automotive vehicle that can be connected and disconnected in order to allow selection of driving power for the vehicle. The shaft connection includes a first shaft segment; a second shaft segment; and a connector linking the first shaft segment to the second shaft segment. The connector selectively connects or disconnects the first shaft segment to the second shaft segment.

13 Claims, 8 Drawing Sheets

(51) Int. Cl.
*F16D 25/061* (2006.01)
*F16D 11/00* (2006.01)

(56) References Cited

U.S. PATENT DOCUMENTS

| | | | | |
|---|---|---|---|---|
| 5,105,517 | A * | 4/1992 | Barnow | B60K 17/26 |
| | | | | 180/247 |
| 5,806,623 | A * | 9/1998 | Clohessy | B60K 17/3515 |
| | | | | 180/233 |
| 6,079,539 | A | 6/2000 | Fetcho et al. | |
| 2002/0187874 | A1 * | 12/2002 | Kazaoka | B60K 17/35 |
| | | | | 475/231 |
| 2012/0193185 | A1 * | 8/2012 | Zhang | F16D 11/14 |
| | | | | 192/69 |
| 2015/0027245 | A1 | 1/2015 | Perakes et al. | |

\* cited by examiner

SHAFT CONNECTION FOR A VEHICLE

FIELD OF THE INVENTION

In general, the invention addresses an automotive vehicle axle and, more specifically, the invention is related to the connection to a transmission shaft on an automotive vehicle that can be connected and disconnected in order to allow selection of the vehicle drivetrain configuration.

BACKGROUND OF THE INVENTION

Automotive vehicles, and particularly vehicles designed to transport goods by road, such as trucks, are generally driven by their rear axles, with a powertrain consisting of the engine and gearbox, mounted in the front section of the vehicle. The powertrain and the powered wheels are connected by a shaft, commonly called a driveshaft, that is connected on one side to the powertrain outlet, generally the gearbox, while on the other it is connected to the differential, in order to transmit power to the wheels.

For road cargo vehicles with two rear axles and more particularly, truck tractors with two rear axles, vehicles may have a 6×2 or 6×4 drivetrain configuration, meaning that only two of the six wheels of the vehicle are powered, generally the two wheels on the first rear axle, or the four wheels on the two rear axles. In some applications, vehicles configured for off-road purposes may also have an 8×4 drivetrain configuration or even a 6×6 or 8×8 drivetrain.

The use of at least two powered axles, as in a 6×4 configuration, may be desirable for legal reasons (in some countries, such as Brazil, a 6×4 drivetrain configuration is required for vehicles carrying high-limit cargoes), as well as for use-related aspects, like vehicles intended for off-road purposes such as on sugarcane plantations or mining operations However, in order to save fuel and reduce tire wear when a vehicle is not loaded, it may be desirable to take an axle out of use. If the drivetrain configuration is a 6×2 configuration, for example, one of the rear axles (not powered) may be raised, thus lowering fuel consumption and tire wear through a technical solution that is already quite widely known, in which an airbag is used to raise the axle, thus making good use of the compressed air line in this type of vehicle.

However, this solution may not be used in vehicles with 6×4 or 8×4 drivetrain configurations, for example, because powered axles may not be raised, as power sent to the raised axle would be lost.

Nevertheless, there is a need to connect or disconnect the drivetrain for at least one axle on a vehicle, particularly a cargo vehicle such as a truck or truck tractor.

The state of the art encompasses some solutions that allow automatic or manual selection of a drivetrain for one or more axles. One known solution consists of connecting or disconnecting the central differential geartrain that powers the axle. However, this solution may not be used for 6×4 or 8×4 drivetrain configurations as no central differential is generally used, with driving power transmitted from one differential geartrain to another sequentially through a driveshaft.

Other more elaborate solutions, such as those disclosed in Arai documents US 2012/0260758 that constitute the state of the art, deploy more complex resources such as clutch-plates and electronic controls. Such solutions are complex and expensive, and may not even work properly for very high torques such as those required for cargo vehicles whose engine torques may easily exceed 1500 Nm and might even reach 3000 Nm.

Consequently, the need persists for a simple technical solution that can be used—with no need for electronic controls—for connecting or disconnecting the drivetrain on the axle of a vehicle, particularly a road cargo vehicle with a 6×4, 8×4 or similar drivetrain configuration. This invention is intended to remove these inconvenient aspects of the state of the art, among others.

DESCRIPTION OF THE INVENTION

Consequently, an objective of the invention is to provide a means for allowing the drivetrain to be disconnected from at least one axle, particularly on a road cargo vehicle with a 6×4 or 8×4 drivetrain configuration.

An additional objective of the invention is to provide a means of disconnecting the driveshaft of the vehicle, particularly a road cargo vehicle with a 6×4 or 8×4 drivetrain configuration.

In order to pursue the objectives outlined above, among others, this invention addresses a driveshaft connection comprised of:
  a first shaft segment;
  a second shaft segment; and
  a means of connection linking the first shaft segment to the second shaft segment;
  through which the means of connection selectively connects or disconnects the first shaft segment to/from the second shaft segment.

Depending on alternative and/or additional aspects of the invention, the following characteristics may also be present, either alone or in technically feasible combinations:
  power is transmitted from the first shaft segment to the second shaft segment when the means of connection is in a connected position, and no driving power is transmitted from such first shaft segment to such second shaft segment when the means of connection is in an unconnected position;
  such second shaft segment is hollow;
  the first shaft segment is concentric to and mounted inside the second shaft segment;
  the means of connection is mounted in a manner whereby such first shaft segment and such second shaft segment mesh together;
  such second shaft segment is comprised of a plurality of inner teeth distributed, at least partially, along its inner perimeter and such first shaft segment is comprised of a plurality of outer teeth distributed, at least partially, along its outer perimeter;
  such sleeve is comprised of a plurality of inner and outer teeth distributed, at least partially, along its inner and outer perimeters, respectively, and that mesh together through such plurality of teeth on such first and second shaft segments;
  such means of connection is associated with a pressure chamber that allows such means of connection to glide axially along such first and second shaft segments as the pressure varies in the chamber;
  such chamber is formed by a jacket mounted between the first and second shaft segments, the inner wall of the such first shaft segment and the jacket;
  such connection is additionally comprised of a means of return for such means of connection;

such a means of return is a spring mounted within such second shaft segment and supported on one side by such second shaft segment and by the chamber on the other.

The invention also addresses a vehicle that is comprised of at least two powered axles, with the power transmitted from the first axle to the second axle along a shaft, whereby the vehicle includes a connection to an axle as defined above. More specifically, the vehicle is a road cargo vehicle, such as a truck, with a 6×4 drivetrain configuration.

BRIEF DESCRIPTION OF THE DRAWINGS

The invention will now be described in terms of specific embodiments, with references to the appended Figures. These Figures are schematic and their dimensions or proportions might not correspond to reality, but are rather intended to offer an explanatory description of an exemplificatory embodiment, not establishing any constraints on the invention whatsoever, other than those defined in the appended Claims, whereby:

DESCRIPTION OF THE EMBODIMENTS OF THE INVENTION

The invention is now described in terms of specific embodiments, referring to the appended Figures showing examples of such embodiments. The reference numbers shown in the Figures are repeated throughout the various views in order to indicate identical or similar technical characteristics. Moreover, terms that may be used here in such as: above, below, upper, lower, side, right, left, front, rear and variations thereof must be construed in compliance with the guidelines given in FIG. 1.

Figure 1:
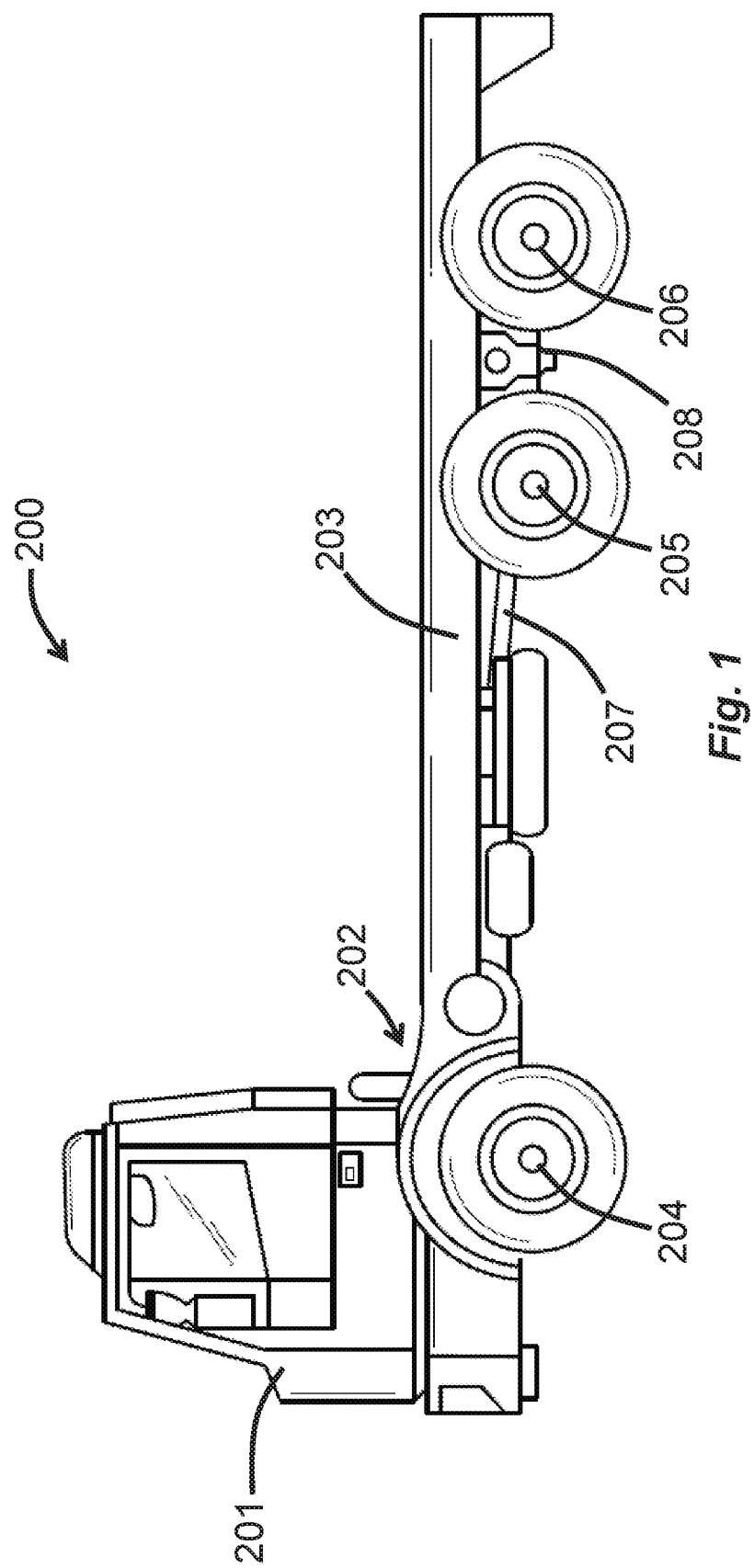
FIG. 1 is a schematic side view of a cargo vehicle, such as a truck, with a 6×4 drivetrain configuration.

FIG. 1 presents a schematic illustration of a vehicle for transporting cargo or goods, such as a truck 200, with a 6×4 drivetrain configuration. Consequently, the truck 200 is comprised of a driver's cab 201 under which is located a set of powertrain transmission equipment 202, such as a combustion engine associated with a gearbox, mounted on a chassis 203 that also supports a front axle 204, a first rear axle 205 and a second rear axle 206. From the gearbox, a driveshaft 207 extends as far as the first rear differential 205 and from the first rear differential, a second driveshaft 208 extends to the to the second rear differential 206. Power is generally divided evenly between the first and second differentials running to the wheels on the first 205 and second 206 rear axles. Thus, the differentials transmit power to the wheels on each axle in a usual manner, using a crown and pinion system and epicyclic gears, in a manner well known to persons skilled in the field. Other details of vehicle 200 are shown schematically, requiring no further explanation as they are already known in ordinary cargo vehicles.

As mentioned above, for certain applications, such as unlimited vehicles, it may be desirable, not to be transmitted from the first rear differential 205 to the second rear differential 206, endowing the vehicle with a 6×2 drivetrain configuration. With this 6×2 drivetrain configuration, the third axle 206 (or the second rear axle) can be raised, in order to save fuel and tire wear. The manner in which the second rear axle is raised may follow the usual known methods, such as making use of an inflatable airbag.

The invention is designed to allow the selective connection or disconnection of the second differential from the third axle 206 (or second rear axle), in order to transform a 6×4 drivetrain configuration into a 6×2 drivetrain configuration. This detailed description of a embodiment of the invention naturally refers to a 6×4/6×2 drivetrain configuration, but the invention may also be naturally used for any drivetrain configuration in which a powered axle should be activated or debts activated, such as 4×4/4×2 or 8×4/8×2 drivetrain configurations etc.

Figure 2:
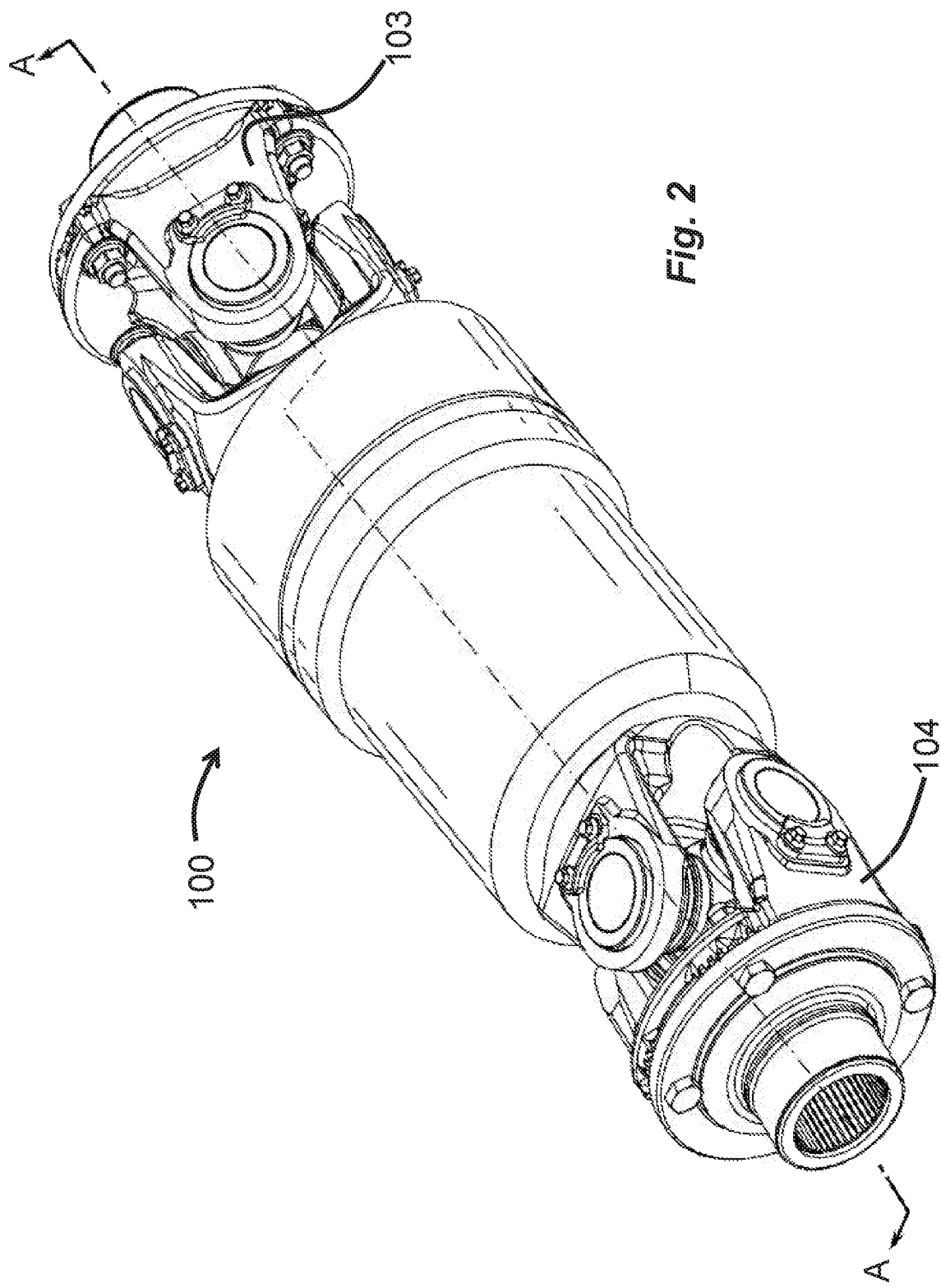
FIG. 2 is a perspective view of a connection to the shaft, according to one embodiment of the invention.

Referring now to FIG. 2, the axle connection 100 is disclosed, linked to a driveshaft, or instead of a driveshaft, mounted between two driveshaft differentials 205, 206 on the vehicle 200. In this manner, the connection addressed by the invention may be mounted between two differentials of two rear axles of a cargo vehicle, be comprised of a 6×4 drivetrain configuration, for example, or may even replace the intermediate driveshaft 208. In this manner, the connection 100 may also be comprised of two universal (cardan) joints 103, 104, each located at each end of the connection and form the mechanical connection transmitting power, while also offsetting variations in distance between the differentials, through an assembly of two concentric toothed shafts 105 (FIG. 3), as the axles 205, 206 may have different assembly heights and may also be solidly mounted on the vehicle suspension, thus being subject to variations in height and consequently distance from each other, due either to the weight of the cargo on the axle uneven ground surfaces. Both the universal (cardan) joints 103, 104 and the assembly 105 allowing variations in length are mechanical constructions that are well known at the state of the art, use widely on driveshafts as they require little space and are low-cost. Consequently, no further details are required in this Specification on the configuration of the universal (cardan) joints 103, 104 and the assembly 105. In alternative embodiments, the universal (cardan) joints 103 and 104 may be replaced by other mechanical construction elements such as homokinetic joints, depending on the torque to be conveyed. The choice among universal (cardan) joints, homokinetic joints or other mechanical construction elements does not affect the technical effects foreseen for the invention.

In an alternative embodiment through which the connection is held firmly on the driveshaft, such as a very long driveshaft, for example, the universal (cardan) joints 103, 104 and the assembly 105 may be replaced by other mounting options, such as flanges with nuts and bolts, or even welding.

Figure 3:
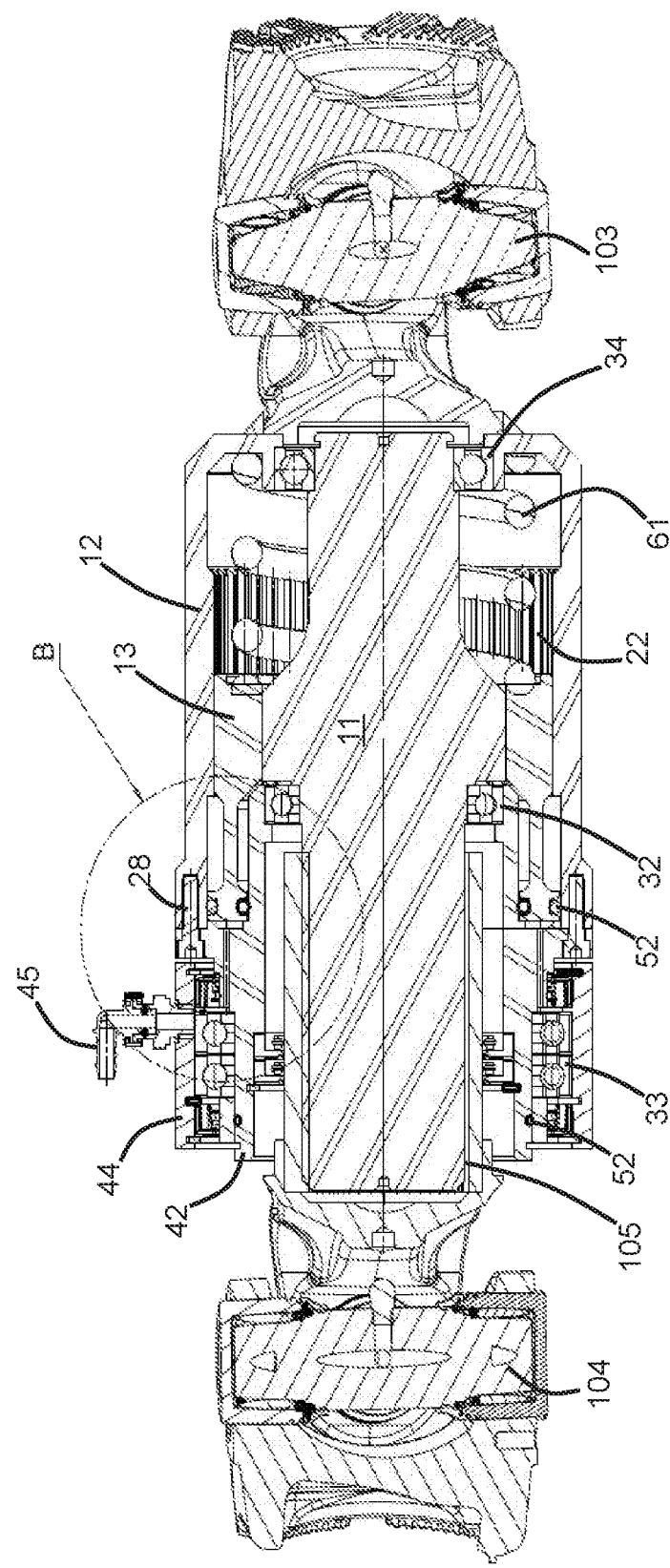
FIG. 3 is a cross-section side view following line A-A of a connection to the shaft, according to one embodiment of the invention shown in FIG. 1, in a configuration through which power is transmitted through the connection.

Referring now to FIG. 3, a connection is disclosed in a power transmission configuration, meaning the configuration through which power is transmitted by the axle through the connection. The connection is thus mounted in a specific manner on the driveshaft, as shown in the embodiment illustrated here, replacing the driveshaft 208 mounted between two driveshaft differentials 205, 206 on the vehicle.

Based on the same guidelines as disclosed in FIG. 1, the connection may be mounted between the two universal (cardan) joints 103, 104 instead of a conventional driveshaft, on the one side comprised of a first shaft segment 11 that may be mounted on a power outlet point, and a second shaft segment 12 that may be mounted on a power intake point in order to receive power from the first shaft segment 11. Both the first 11 and the second 12 shaft segments may be connected to or disconnected from each other through a connector or a means of connection 13, in order to transmit the power (or not) from the first to the second shaft segment 11, 12, selectively as required.

Naturally, although it has been mentioned here that the first shaft segment 11 may be mounted on a power outlet point and the second shaft segment 12 may be mounted on a power intake point, the configuration may be inverted, meaning that the first shaft segment 11 may be mounted on a power intake point and the second shaft segment 12 may be mounted on a power outlet point, without adversely affecting the technical effect obtained, or resulting in any difference therein.

With regard to FIGS. 3 to 6, in order to allow this connection, in an exemplificatory embodiment, the first shaft segment 11 may be comprised of a toothed profile, with teeth projecting radially along its outer perimeter and along at least part of its length. On the one side, at the portion of shaft segment 11 which is solidly connected to the assembly 105, the teeth 106 project radially along the outer perimeter of the portion of shaft segment 11 and in appropriate quantities and sizes as required mesh and function smoothly with the inner teeth in the assembly 105. As mentioned above, the assembly 105 is a common solution used for drive shafts and has no direct effect on the invention, as this assembly is intended to offset variations in length to which driveshafts may be subject. On the other hand, shaft segment 11 has a second toothed region 21, generally with a larger diameter also with a set of gearing teeth arrayed along its outer perimeter, which is intended to function as a means of connection or connector 13, as will be explained more clearly in this Specification.

With regard to FIGS. 3 to 6, the second shaft segment 12 is also toothed, but is comprised of teeth 22 that project radially along its inner perimeter. Here, the second shaft segment 12 is a hollow cup-shaped shaft with one open side and one close, comprised of a plurality of teeth 22 arrayed radially along its inner perimeter and that extent at least partially along its inner length, with no need for the assembly 105 in order to offset differences in driveshaft lengths. Alternatively, the assembly 105 may be located on the side of the second shaft segment 12 rather than on the side of the first shaft segment 11.

Located between the first shaft segment 11 and the second shaft segment 12 is a connector or a means of connection 13. The connector or means of connection 13 may be any device, allowing a selective connection between the first 11 and the second 12 shaft segments that allows power to be transmitted (or not) between the two shaft segments. Suitable connectors or means of connection may include a clutchplate, a magnetic connection, a mechanical connection etc., without being limited thereto, meaning any appropriate means of connection that allows power to be transmitted selectively between the two shaft segments 11, 12.

In a specific embodiment of the invention illustrated here, the connector or the means of connection may consist of the sleeve 13 that is comprised of a plurality of teeth on both its inner and outer perimeters, whereby the teeth located on its outer perimeter 24 are intended to slot into and function with the teeth 22 located on the inner perimeter of the second shaft segment 12, and the teeth located on its inner perimeter 23 are intended to slot into and function with the teeth located on the outer perimeter 21 of the first shaft segment 11. The sleeve may slide between these two and more particularly slide inside the second shaft segment 12 in order to connect to or disconnect from the teeth 21 of the first shaft segment 11, as will be explained more clearly in the following description. Consequently, the first shaft segment 11 may be mounted concentrically on the second shaft segment 12 and the sleeve 13, in order to allow the sleeve 13 to slide.

The number of teeth 21 on the first shaft segment 11 may vary and may be defined in compliance with project design specifications, such as those defined by the torque to be transmitted. Typically, a number of teeth comprised of 18 to 30 teeth, and more particularly 24 teeth, may be appropriate. The number of teeth 22 located on the second shaft segment 12 may thus vary and may be defined in compliance with project design specifications, and may fall in a range of 45 to 60 teeth, such as 52 teeth. The sleeve 13 must be comprised of an appropriate number of teeth on both its outer and inner parameters, in order to mesh firmly with the teeth 21 on the first shaft segment 11 and the teeth 22 on the second shaft segment 12.

In the configuration shown in FIG. 3, based on a reference datum, power is transmitted from the first shaft segment 11 to the means of connection 13 that in turn transmits power to the second shaft segment 12 through the connection between the teeth 21 on the first axle segment 11 to the inner teeth 23 of the sleeve 13, and through the outer teeth of the sleeve 24 to the teeth 22 on the second shaft segment 12. Naturally, the logic is the same for a reversed reference, meaning that power may be transmitted from the second shaft segment 12 through the connector or means of connection 13 to the first shaft segment 11.

Furthermore, although the second shaft segment 12 is hollow, there is no reason why the first shaft segment 11 should not be hollow as well, as this mechanical construction configuration generally ensures greater resistance to torsion, provided that the diameter of the first shaft segment 11 is smaller than the diameter of the second shaft segment 12, as shown in this exemplificatory embodiment of the invention, and that the means of connection 13 forms a connecting interface between the two shaft segments.

Figure 4:
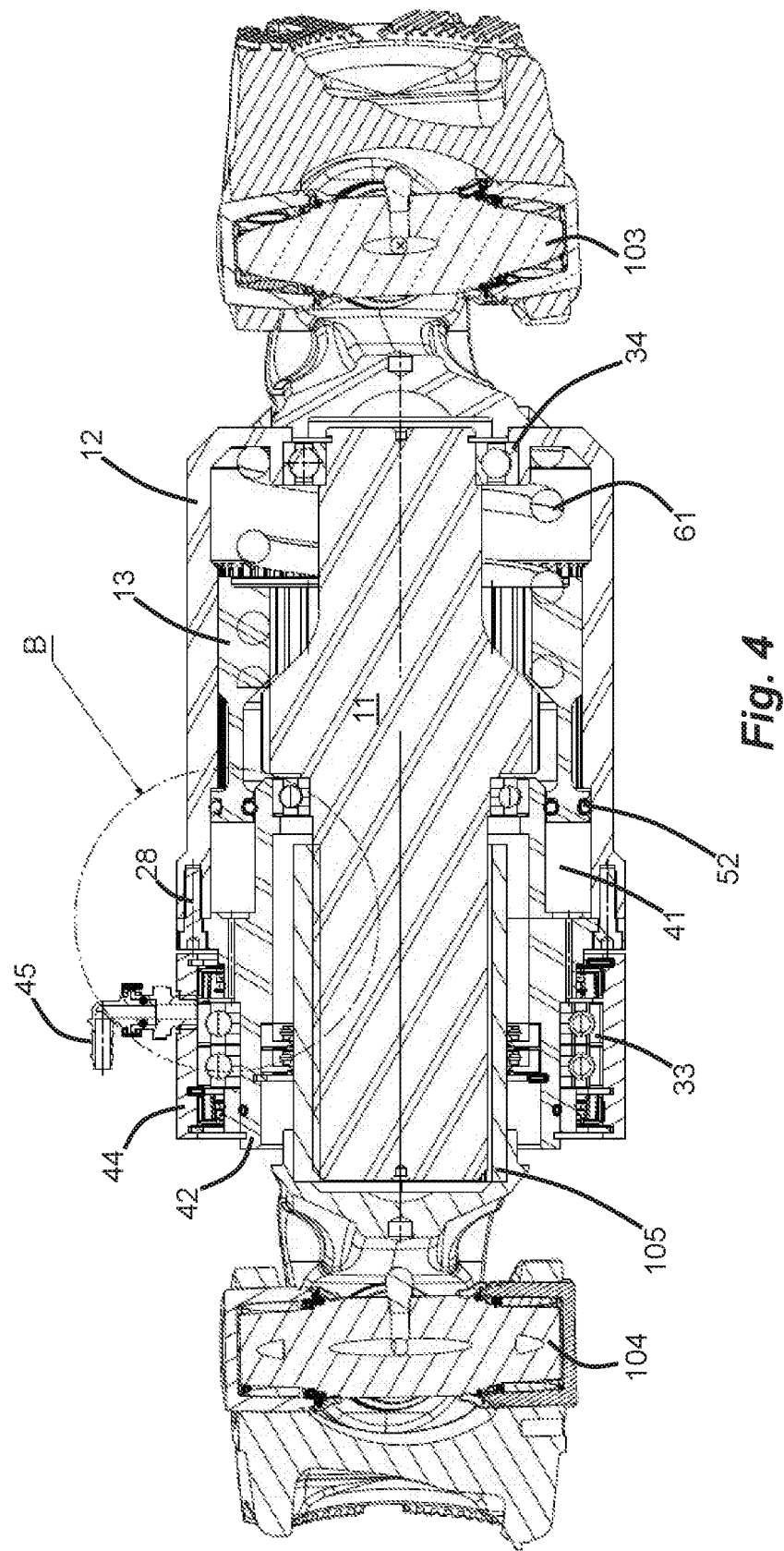
FIG. 4 is the same as side view as shown in FIG. 3, but in a disconnected configuration through which power is not transmitted through the connection.

FIG. 4 discloses the connection in FIG. 3, in a configuration through which power is not transmitted between shaft segments 11, 12 whereby, as shown in this representation, the sleeve 13 is axially displaced to a second position in which there is no connection between the first shaft segment 11 and the inner teeth 22 of the sleeve 13.

In order to allow the axial displacement of the sleeve 13 used in this embodiment with the connector or means of connection, any type of appropriate means may be used, such as mechanical, magnetic, electrical, hydraulic means etc., but without being limited thereto, indicating any appropriate means that allow the sleeve 13 to slide between at least two positions, thus connecting to or disconnecting from the first shaft segment 11.

Figure 7:
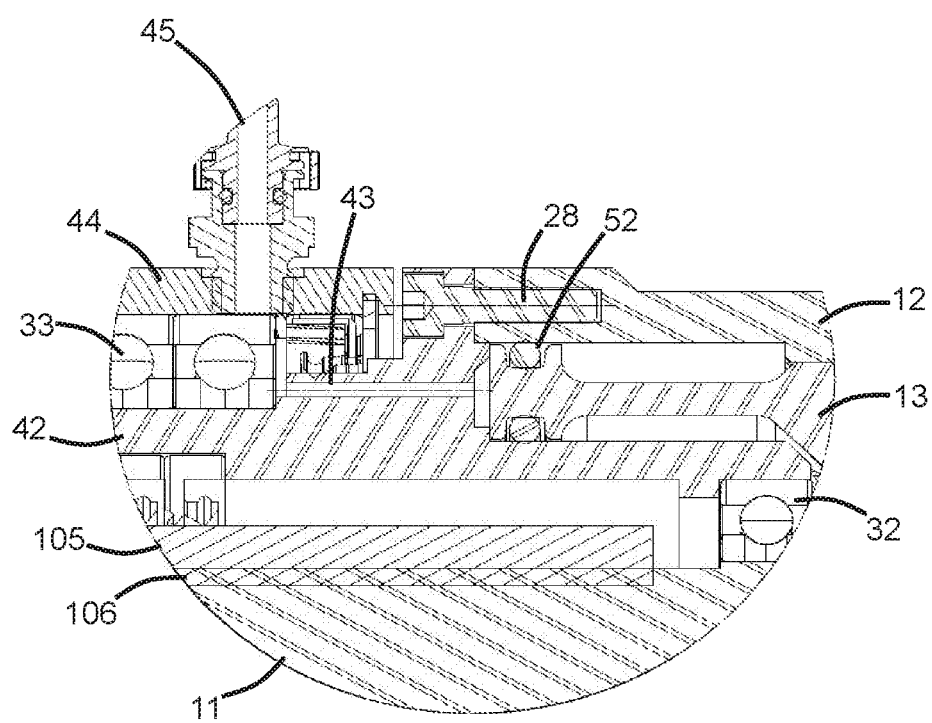
FIG. 7 is a detailed view B of FIGS. 3 and 4, in a configuration where power is transmitted through the connection.
Figure 8:
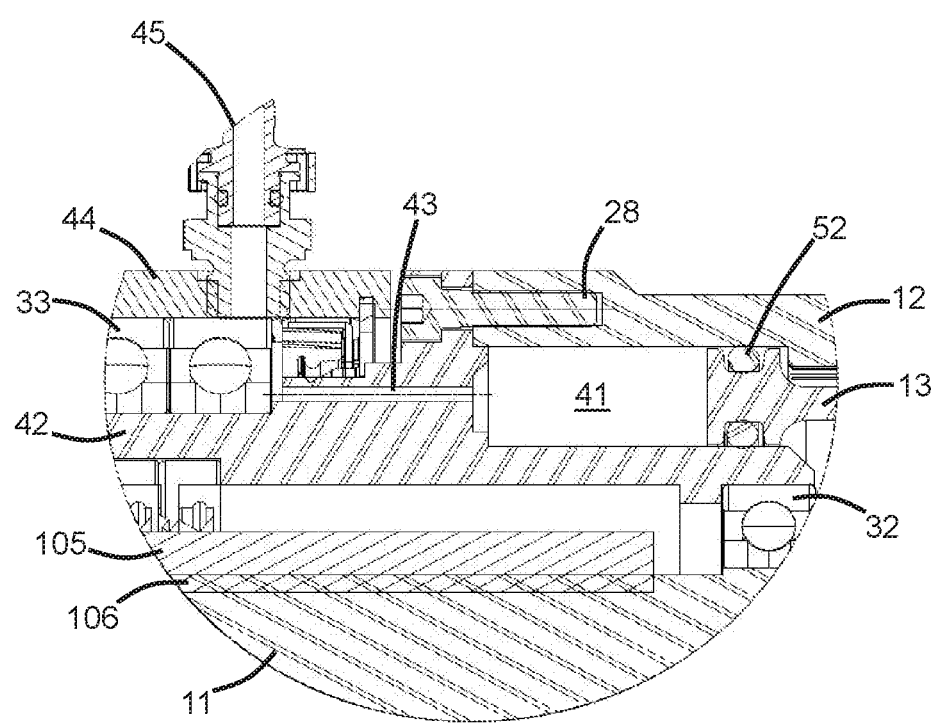
FIG. 8 is the same view as in FIG. 7, but in a configuration where power is not transmitted through the connection.

In this embodiment, compressed air is used. Using compressed air as a means for allowing the sleeve 13 to move is appropriate, as it makes good use of the compressed air line already in place on most commercial vehicles. In order to do so, the chamber 41 may be used, which is disclosed in greater detail in FIGS. 7 and 8, consisting on the one hand, of a jacket 42 located between the outer perimeter of the first shaft segment 11 and the inner wall of the second shaft segment 12. The jacket 42 may be mounted on the second shaft segment 12, with the jacket 42 and the second shaft segment 12 thus being comprised of a flange 15, 15' with mounting bolts 28. The number of boats used may vary, depending on project design specifications, and may range from 10 to 16 bolts, particularly 12 bolts. The inner wall of the second shaft segment 12 closes the chamber 41 on top.

Figure 5:
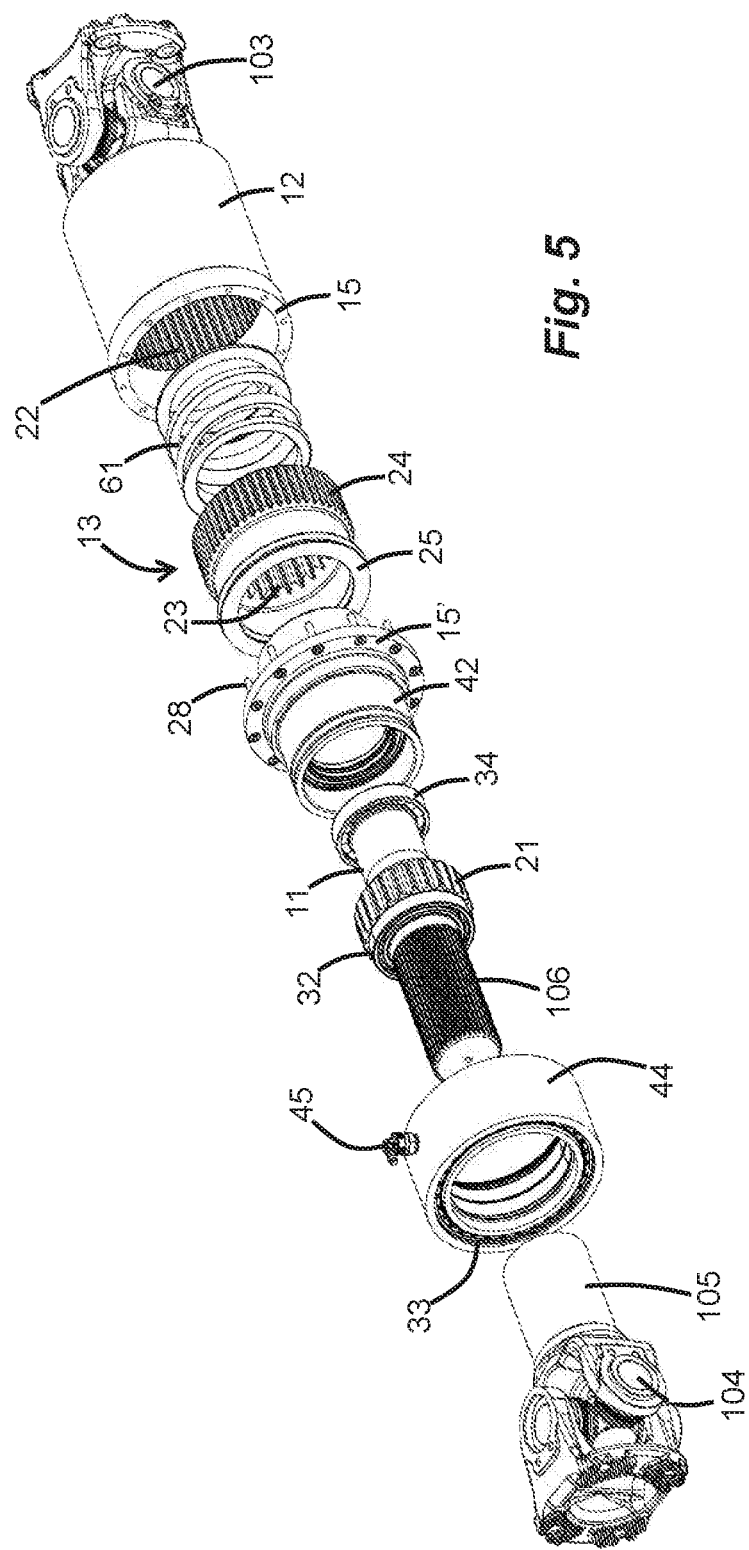
FIG. 5 is an expanded perspective view of the connection to the shaft, according to one embodiment of the invention shown in FIGS. 2 to 4.
Figure 6:
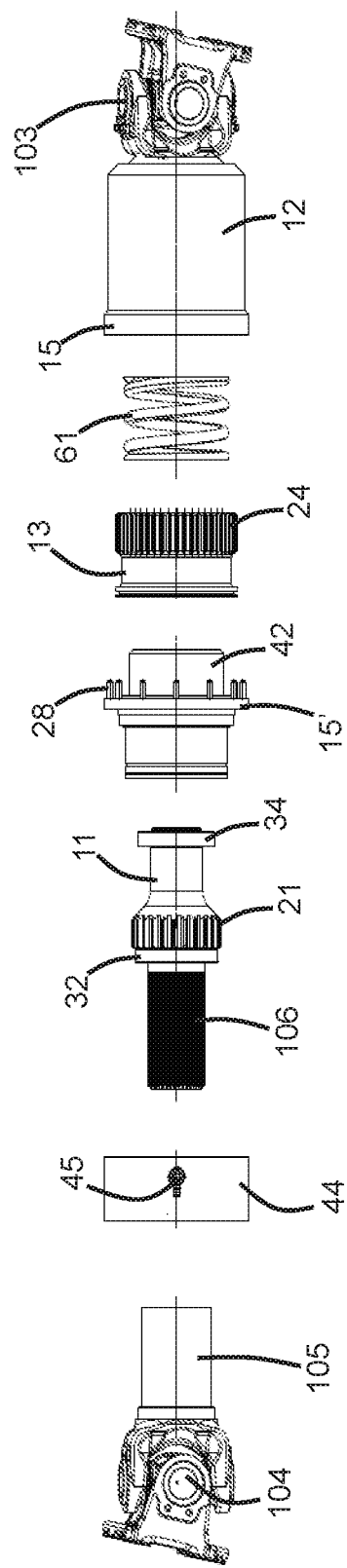
FIG. 6 is expanded side view of the connection shown in FIGS. 2 to 4.

As may be noted in FIGS. 5 and 6, the sleeve 13 may be comprised of a buffer stop 25 thousand or more which can slide into the chamber 41. The chamber may be fluidly linked to a pressure source such as a compressed air line that is usual in cargo vehicles, which purpose a cover 44 may be used that, on the one hand, is comprised of a compressed air intake point 45 that is in fluid communication with the compressed air line of the vehicle and, on the other hand, extends in fluid communication to a channel 43 in the jacket 42 which in turn allows fluid communication with the inside of the chamber 41. Consequently, the channel 43 forms a fluid connection between the inside of the chamber 41 and the compressed air line (not shown) of the vehicle, whereby the pressure in the chamber may be varied through injecting or ejecting air, whereby the sleeve 13 may be shifted to a first position, where it is connected to both the first shaft segment 11 and the second shaft segment 12, and through which the pressure in the chamber is approximately equal to the outside air pressure, as well as a second unconnected position, where the sleeve 13 is not connected to the first shaft segment 11, and where the pressure in the chamber is higher than the outside air pressure.

As the jacket 42 is firmly mounted on the second shaft segment 12, it may rotate, while the cover 44 is preferably mounted in a static manner, in order to allow the connection 45 with the compressed air line. To do so, one or more bearings 33 may be positioned in order to allow the rotating movement of the jacket 42 in terms of the cover 44. Furthermore, other bearings 32, 34 may be positioned in order to support the first shaft segment 11, thus allowing the rotation of one shaft segment in terms of the other, in a configuration through which the sleeve 13 is disconnected and, in this case, one shaft segment shall rotate while the other remains free, as may be understood by persons skilled in the field. Naturally, the bearings described here may be replaced by other equivalent mechanical construction elements such as engine bearings. Such bearings may also be any appropriate bearings, such as ball bearings, needle rollers, cylindrical rollers etc.

Naturally, although this description refers to the use of compressed air in order to vary the pressure in the chamber 41, other means may also be used, such as other fluids like oil or water, or magnetic or electromechanical means such as solenoid valves. Furthermore, although mentioning that the sleeve 13 is in the connected position when the pressure in the chamber is approximately equal to the outside air pressure, such embodiment may naturally be inverted, whereby the sleeve is in the connected position only when the pressure in the chamber is increased, although this is less preferable due to operating safety issues. Nevertheless, although this Specification refers to "outside air pressure" and "higher pressure" than the outside air pressure, other pressure differentials may naturally be used that are not necessarily based on air pressure as the basic pressure, but also higher pressures or even negative pressures using vacuums, provided that there is sufficient pressure differential in the chamber 41 to ensure that the sleeve 13 shifts with an axial movement as set forth in this embodiment.

In order to ensure that the chamber is leakproof, one or more sealing options may be used, such as elastomer O-rings 52, if mounted on the buffer stop 25 of the sleeve 13, as shown in FIGS. 3 to 6, or at other points on the connection assembly 100.

In order to ensure that the connector or means of connection 13 returns when the pressure drops in the chamber 41, and also in order to prevent the means of connection slipping from a connected position to an unconnected position, a means of return, such as a spiral spring 61, may be may be used in order to ensure that the means of connection or connector remains in a pre-determined position, such as the standard connected position, as shown in the drawings, or the opposite, in a standard disconnected position. Naturally, a means of return may be suppressed if other means of moving the means of connection 13 are used, such as mechanical or electromechanical means. However, other means of return may also be used, such as magnetic, mechanical, hydraulic means, etc.

In this embodiment, the spring may be mounted inside the second shaft segment 12, in contact on one side with the means of connection 13 on the side across from the buffer stop 25, and on the other, supporting the inner wall of the second shaft segment 12, on the side of the connection with the universal (Cardan) joint 103. The spring 61 is thus compressed and extended as the sleeve 13 moves axially in the second shaft segment 12, due to the pressure provided by the chamber 41 on the sleeve 13. Consequently, the pressure must be sufficient to compress the spring 61, as well as moving the sleeve 13. A sufficient working pressure may be around 2 bars, and may even reach 4 bars, although the pressure should not be very high in order to avoid damaging the seals 52. The spring used and its spring constant may also be defined by project design specifications and may be, for example, a spring constant value k between 40 and 70 N/mm, or around 50 N/mm.

The entire assembly may be lubricated through static lubrication with the lube oil stored in the connection 100, or dynamic lubrication with the lube oil circulating through the connection 100 in specific hydraulic lines intended for this purpose.

When in operation, and as is apparent from the above description, when the 6×4 drivetrain configuration is desired, as shown in this example, the sleeve 13 is connected to both the first 11 and second 12 shaft segments, whereby power (torque and rotation) is thus transmitted from the first shaft segment 11 to the second shaft segment 12 through the sleeve 13. On the other hand, if the road cargo vehicle is not loaded, in this case there is no need for drivetrains on both axles, and a 6×2 drivetrain configuration may be adopted. Thus, through a command such as a valve (not shown) air may be allowed to flow under pressure through the intake 45 along the channel 43 and into the chamber 41. When receiving pressure, the volume of the chamber will expand, moving the sleeve the sleeve 13 axially along the inside of the second shaft segment 12 to a position where the inner teeth 23 disconnect from the teeth 21 of the first shaft segment, thus imposing pressure on the spring 61. As soon as a pre-determined pressure is reached, in order to ensure that the means of connection 13 reaches a specific position where the teeth 21, 23 are no longer connected, the pressure may be maintained in the chamber through the valve (not shown) and, should any drop in pressure occur, the compressed air line may provide the pressure needed to ensure that the means of connection does not return. In this manner, driving power is not transmitted to the second shaft segment that, in this configuration, is associated with the differential, whereby the vehicle then operates with a type of drivetrain configuration known as 6×2. Moreover, the axle that is no longer powered may be raised through solutions that are already known, if desired, in order to avoid the tires coming into contact with the ground.

When returning to a 6×4 configuration, it is sufficient to ease the pressure in the chamber 41, whereby the force imposed by the spring 61 will ensure that the sleeve 13 returns to a connected position between the first 11 and second 12 shaft segments.

More specifically, the connection and disconnection of the connector or the means of connection 13 must take place when the vehicle is halted, meaning when the connection is not rotating, although nothing prevents such connection and/or disconnection from taking place while the vehicle is moving, although less preferable.

Although this Specification mentions a connection 100, it is clear that the connection consists of several mechanical construction elements, whereby the connection 100 may also be called a connection set or assembly.

Although the invention is described in terms of its specific embodiments, persons skilled in the field may introduce many alterations or variations through the teachings disclosed here, without deviating from the principles of the invention. For example, the different elements described may be put together in a different manner not addressed in the illustrated embodiments, but leading to the same technical outcome. Consequently, the appended Claims must be construed in a broad-ranging manner, encompassing all equivalents of the invention.

The invention claimed is:

1. A coupling mechanism for a shaft, the coupling mechanism comprising:
   a first shaft segment having an end with a bearing coupled thereto;
   a second shaft segment, both the first shaft segment and the second shaft segment being rotatable, the bearing being coupled to the second shaft segment, the bearing supporting the end within the second shaft segment;
   a coupler for coupling the first shaft segment to the second shaft segment,
   wherein the coupler selectively couples or uncouples the first shaft segment with the second shaft segment, the coupler being associated with a pressure chamber which allows axial sliding of the coupler along the first and second shaft segments upon variation of pressure in the chamber, the chamber being formed by an inner wall of the second shaft segment and by a jacket mounted between the first and the second shaft segments; and
   an other bearing rotatably coupled to the jacket and to the first shaft segment.

2. The coupling mechanism according to claim 1, wherein power is transmitted from the first shaft segment to the second shaft segment when the coupler is in a coupled position, and there is no power transmission from the first shaft segment to the second shaft segment when the coupler is in an uncoupled position.

3. The coupling mechanism according to claim 1, wherein the second shaft segment is hollow.

4. The coupling mechanism according to claim 3, wherein the first shaft segment is concentric to and mounted within the second shaft segment.

5. The coupling mechanism according to claim 4, wherein the coupler is cooperatively mounted between the first shaft segment and the second shaft segment.

6. The coupling mechanism according to claim 1, wherein the second shaft segment comprises a plurality of inner teeth arranged, at least partially, along its inner perimeter, and the first shaft segment comprises a plurality of teeth arranged, at least partially, along its outer perimeter.

7. The coupling mechanism according to claim 6, wherein the coupler comprises a plurality of inner and outer teeth arranged, at least partially, along its inner and outer perimeter, respectively, cooperating with the plurality of teeth of the first and second shaft segments.

8. The coupling mechanism according to claim 7, wherein the coupling mechanism further comprises a return for the coupler.

9. The coupling mechanism according to claim 8, wherein the return is a spring mounted within the second shaft segment and supported on one side by the second shaft segment and on the other side by the chamber.

10. The coupling mechanism according to claim 1, wherein the jacket is firmly mounted to the second shaft segment.

11. The coupling mechanism according to claim 10, further comprising a cover mounted in a static manner, the jacket being rotatably coupled to the cover, the cover having a connection to a compressed air line.

12. A vehicle comprising:
   a gearbox;
   a driveshaft coupled to the gearbox;
   an axle connection coupled to the driveshaft, the axle connection including:
      a first shaft segment;
      a second shaft segment;
      a coupler for coupling the first shaft segment to the second shaft segment, wherein the coupler selectively couples or uncouples the first shaft segment with the second shaft segment, wherein the coupler is associated with a pressure chamber which allows axial sliding of the coupler along the first and second shaft segments upon variation of pressure in the chamber, the chamber being formed by an inner wall of the second shaft segment and by a jacket mounted between the first and the second shaft segments; and
   a bearing positioned between the jacket and the first shaft segment, the bearing supporting the first shaft segment.

13. The vehicle according to claim 12, wherein the vehicle is a goods transport vehicle having a 6×4-wheel drive configuration.

* * * * *